UNITED STATES PATENT OFFICE.

ALBERT L. REINMANN, OF PITTSBURG, PENNSYLVANIA.

CEMENT FOR SECURING METAL RINGS TO ELECTRIC-LAMP BULBS AND FOR OTHER PURPOSES.

SPECIFICATION forming part of Letters Patent No. 345,542, dated July 13, 1886.

Application filed March 31, 1886. Serial No. 197,248. (Specimens.)

*To all whom it may concern:*

Be it known that I, ALBERT L. REINMANN, residing at Pittsburg, in the county of Allegheny and State of Pennsylvania, a citizen of the United States, have invented or discovered certain new and useful Improvements in Cements for Securing Metal Rings to Electric-Lamp Bulbs and for other Purposes, of which improvements the following is a specification.

The invention herein relates to certain improvements in cements especially adapted for use in securing the bulbs of incandescent electric lamps to metal rings or collars, whereby the bulbs are attached to their sockets.

In carrying out my invention I mix approximately one part of calamine with two parts of chalk, by bulk, or eight ounces of calamine and four ounces of chalk, by weight. After thoroughly mixing these substances, some suitable adhesive material—such as mucilage or glue—is added thereto in sufficient quantity to form a thick paste. In case glue is used it should be heated so as to be in a fluid condition, and when the cement having glue as one of its constituents is to be used it should be heated.

As the above-described cement contracts considerably in hardening, and is therefore liable to break any easily-frangible article to which it may be applied, I add a small amount of glycerine to the ingredients above mentioned, said glycerine rendering the cement somewhat elastic even after it has become hard. In lieu of the glycerine, molasses or melted sugar may be employed.

I claim herein as my invention—

1. A cement composed of calamine, chalk, and a suitable adhesive material, in about the proportions herein stated, substantially as set forth.

2. A cement composed of calamine, chalk, a suitable adhesive material, and glycerine, in about the proportions stated, substantially as set forth.

In testimony whereof I have hereunto set my hand.

ALBERT L. REINMANN.

Witnesses:
DARWIN S. WOLCOTT,
R. H. WHITTLESEY.